United States Patent Office.

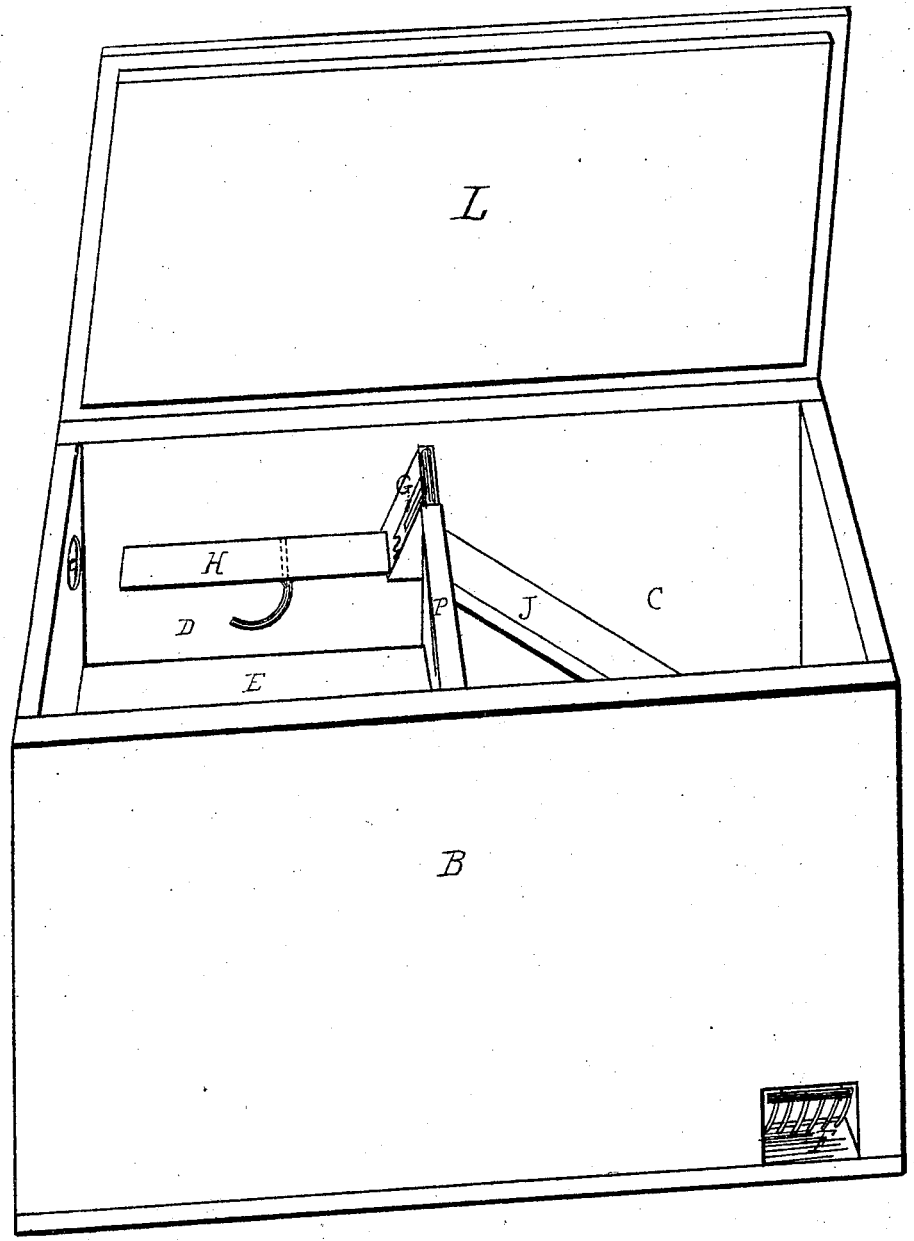

WILLIAM HUNTINGTON, OF HOWELL, MICHIGAN.

Letters Patent No. 72,396, dated December 17, 1867.

IMPROVED ANIMAL-TRAP.

*The Schedule referred to in these Letters Patent and making part of the same.*

TO ALL WHOM IT MAY CONCERN:

Be it known that I, WILLIAM HUNTINGTON, of Howell, in the county of Livingston, and State of Michigan, have invented a new and useful Improvement in Animal-Traps, for entrapping and destroying rats, mice, and other vermin, so that their bodies will be preserved from decomposition; and I do hereby declare that the following is a full, clear, and exact description of the construction and operation of the same, reference being had to the annexed drawing, and letters of reference marked thereon, forming part of this specification, and exhibiting a perspective view of the trap.

My improved trap may be either portable, as exhibited in the drawing, or it may be permanent, and built into and form part of the granary, dwelling, barn, or bin, which it is intended to protect.

It consists of a box, B, divided by a partition, P, into two compartments, C and D, which latter should be made perfectly tight, as it is intended to fill it partially with either a strong, salt brine, indicated at E, or any other well-known antiseptic liquid not liable to freeze during winter. I make two apertures in the box for the passage of the animal—one as at F, in any convenient position to admit him at the bottom into the compartment C, and another at the top of the partition, as seen at G, to allow him to pass through on to a tilting-platform, indicated at H, which I usually make of tin, or other sheet metal, having a smooth surface, and not liable to corrosion.

I find it best to introduce and fasten short passage-ways within the apertures aforesaid, to which I pivot light wicket-gates, as at $i\ i$, which gates may be of light wire-work or perforated sheet metal, hung in such manner that they will rest at an incline on the bottom of the passage-way or casings, and only lift in one direction, so as to prevent the return of the animal after he has once passed through, either partially or entirely. J represents an inclined roadway, to enable the animal to mount to the passage at G, immediately opposite to which, in line with the tilting-platform, I usually make an opening in the end of the box, and cover the same with a piece of clear window-glass, or fine wire-sieve cloth, so as to admit a strong light. This opening is partially seen at $e$.

The lid L of the box being closed, a rat, for instance, having entered the compartment C through the lower inclined gate at F, will, when he finds himself imprisoned by the dropping of said gate, and before touching any bait that may be placed there, seek for some safe place of egress, and, attracted by the light, will first try the passage at G, where he sees the apparent opening $e$ through the box. He passes through this gate, and cannot avoid stepping on the tilting-platform H, to reach this apparent hole, when the platform tilts, and he is precipitated into the brine or other fluid, and is drowned, and his body preserved from putrefaction until the reservoir is sufficiently full, and it is convenient to remove and bury him.

This arrangement of mine requires no setting or watching. A rat or mouse, or other small vermin, can always enter freely, on explorations, or when seduced by a little strong-smelling and attractive bait, and once inside, they are sure to destroy themselves in their frantic efforts to escape, and their dead bodies, not tainting the air, require no immediate attention, and do not convey any premonitory alarm to new comers.

I do not wish to confine myself to a construction of a portable character, for it is evident that the same arrangement may be readily applied to a building, by forming the ingress and egress-passages F and G in the side thereof next the floor, the brine-compartment being sunk in the ground and connected by casings, so as to form a continuous passage.

I do not claim, irrespectively, the arrangement of the dark and light compartments, as this forms one feature of Ellis & Albertson's animal-trap, patented July 31, 1866; neither do I claim of itself any novelty in the inclined hinged wicket-gate, as this is common to many kinds of traps; but, having described my invention,

What I claim, and desire to secure by Letters Patent, is as follows:

I claim the arrangement and combination of the gated apertures F G and tilting-platform H, with the box-compartments C and D, the latter being lighted, and containing brine or other antiseptic liquid, substantially in the manner and for the purpose herein specified.

WM. HUNTINGTON.

Witnesses:
    JULIUS D. SMITH,
    N. J. HOLT.